April 24, 1934.  F. KNOBEL  1,956,445
DITCHER
Filed Aug. 31, 1932  2 Sheets-Sheet 1
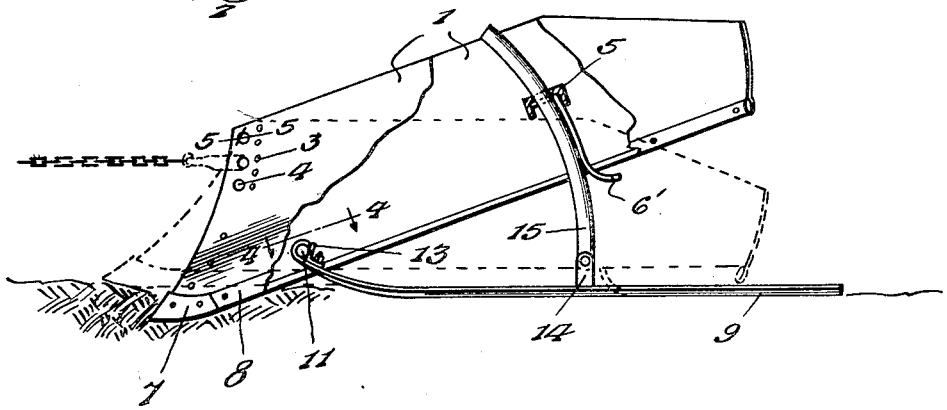
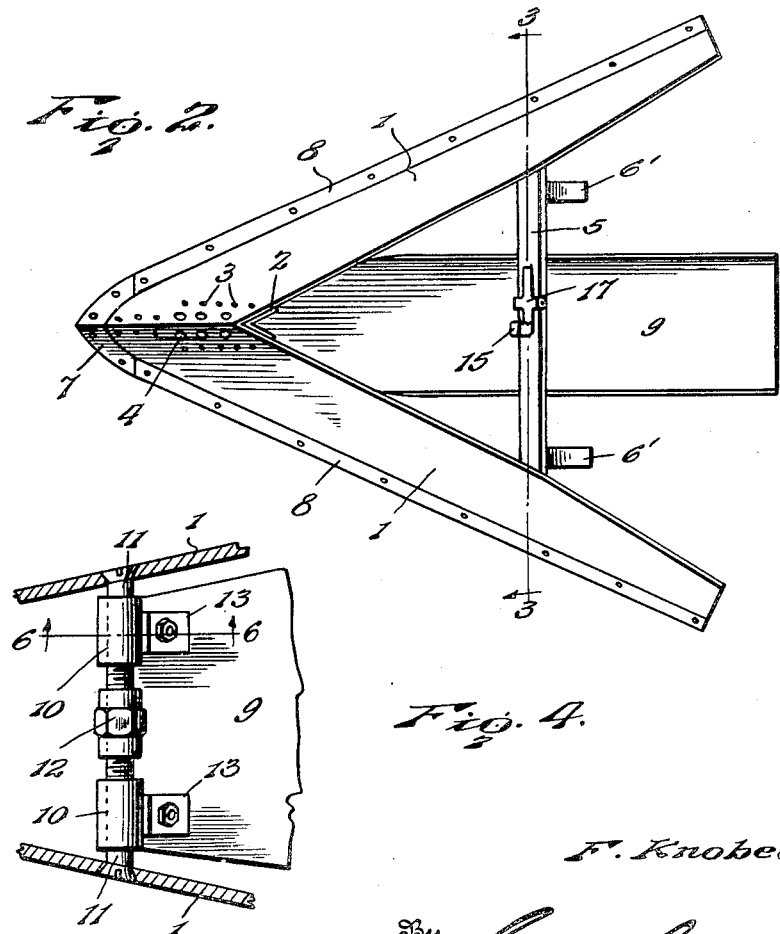
Inventor
F. Knobel.
By Lacey & Lacey, Attorneys April 24, 1934. F. KNOBEL 1,956,445
DITCHER
Filed Aug. 31, 1932 2 Sheets-Sheet 2
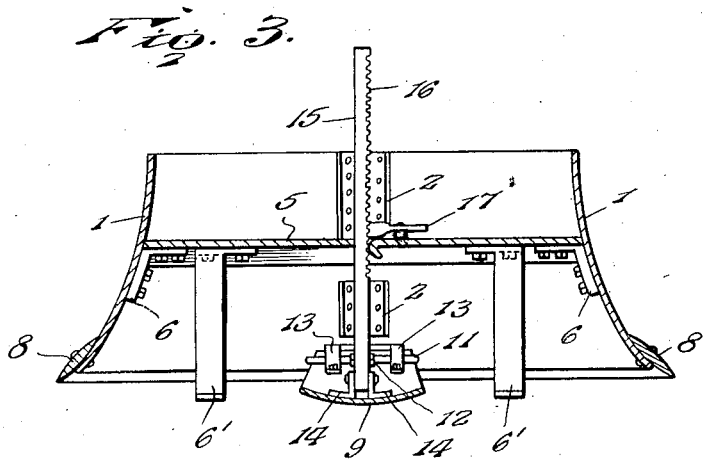
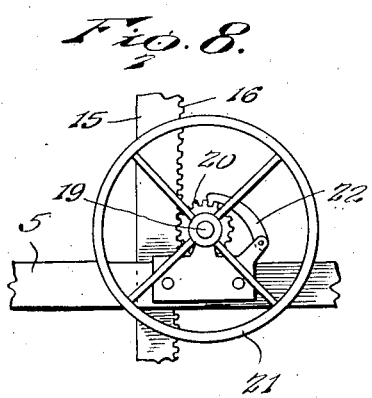
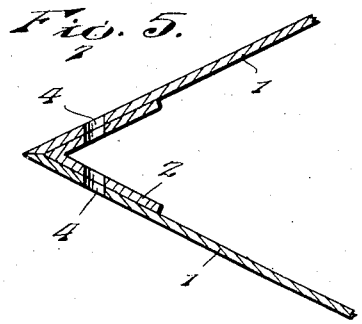
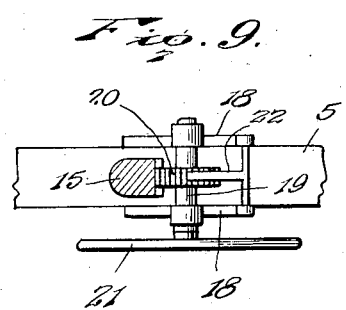
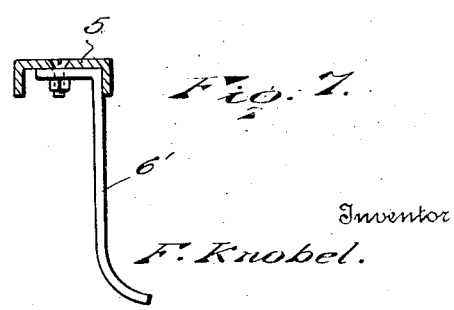
Inventor
F. Knobel.
By Lacey & Lacey, Attorneys Patented Apr. 24, 1934

1,956,445

UNITED STATES PATENT OFFICE 1,956,445

DITCHER

Fred Knobel, Odessa, Nebr.

Application August 31, 1932, Serial No. 631,279

4 Claims. (Cl. 37—98)

This invention relates to a machine or apparatus which is especially designed for excavating or digging trenches or ditches used primarily for farm irrigating purposes.

The purpose of the invention is to provide a simple and economical structure for ditch digging purposes in which the several parts will be arranged in a novel and convenient manner, producing an apparatus which will meet the requirements of a device of this class in a highly satisfactory manner.

In the accompanying drawings, Fig. 1 is a side elevation of an apparatus embodying the invention, Fig. 2 is a top plan view of the structure seen in Fig. 1, Fig. 3 is a transverse section on the line 3—3 of Fig. 2, Fig. 4 is a detail horizontal section taken approximately on the line 4—4 of Fig. 1, Fig. 5 is a detail section taken about on the line 5—5 of Fig. 1, Fig. 6 is a detail section on the line 6—6 of Fig. 4, Fig. 7 is a detail section showing one of the side runners or stabilizers, Fig. 8 is a detail elevational view of an operating handwheel and pawl and ratchet mechanism, Fig. 9 is a top plan view of the structure seen in Fig. 8.

Referring now to the drawings by distinguishing reference characters, it will be observed that the excavating device comprises a pair of duplicate forwardly converging side plates or moldboards 1, joined at their front ends so that the device appears as of general V-shaped configuration in top plan view. The transverse curvature of the moldboards is calculated to produce the desired earth shedding action, and they are reenforced at the point of convergence by vertical angle irons 2 which are V-shaped to fit closely in the angle formed by the meeting front ends of the moldboards. These reenforcing plates are riveted to the moldboards, as indicated at 3, and openings 4 are formed in the moldboards and the reenforcements for the attachment of a draft device which may be a chain connected to a tractor.

Extending between the moldboards is a cross bar 5 which is fastened at its ends to brackets 6 secured to the inner sides of the moldboards between the ends of the latter. In addition to serving as a brace for the moldboards, this cross bar constitutes a support for side runners 6' which drag along the surface when the implement is lowered, as shown by dotted lines in Fig. 1 and resist rocking so that the device will be stable while at work.

At the lower front corners of the moldboards there is secured a cutting point 7 and along the lower edges of the moldboards are secured cutting bars 8. The cutters 8 are symmetrical and have upper and lower cutting edges, as shown in Fig. 3, so that when one cutting edge has become dull and worn, the cutter may be removed and reversed and again secured in place without seriously delaying the ditching operation.

A suitably proportioned transversely bowed longitudinal runner 9 is disposed between the moldboards and has its forward end upturned and formed into a pair of pivot hooks 10 engaging over the smooth portions of complemental bolts 11 which are countersunk in the respective moldboards and have their threaded ends projecting therefrom and connected by an internally threaded coupling sleeve 12 whereby they will be maintained in alinement and will aid in bracing the moldboards. The hooks 10 are maintained in pivotal engagement with the bolts 11 by retaining clips or brackets 13 which are detachably secured upon the runner 9 and rise therefrom at the rear of the bolts 11 and bear against the edges of the hooks, as shown clearly in Fig. 6.

On the upper side of the runner 9 are lugs or brackets 14, to and between which is pivoted the lower end of a standard 15 extending up through a guide opening in the cross brace 5. One side of the standard is provided with rack teeth 16 adapted to be engaged by a spring-pressed toothed latch or dog 17, mounted on the brace, in any raised position in which it may be set.

In Figs. 8 and 9, I have shown an arrangement to facilitate adjustment in which a pair of brackets 18 are secured to the brace 5 and provide bearings for a rotary shaft 19 on which a pinion 20 is mounted, said pinion being in mesh with the rack teeth. The shaft is provided with a suitable handwheel 21 to facilitate adjustment, and a retaining pawl 22 is mounted on the brace to engage the pinion and maintain the adjustment of parts.

The implement is employed for making new ditches as well as for clearing old ditches which have been washed in or in which weeds or rubbish have accumulated. The double moldboard symmetrical arrangement permits both sides of the ditch to be formed at once and the sides will be alike, and by raising the rear ends of the moldboards, as shown by full lines in Fig. 1, the sharp point will be set so as to very readily penetrate the ground. When tilted, the implement may make a narrow ditch and a wider ditch may be made by setting the moldboards nearer the horizontal, or by going through the ditch several times it may be made deeper and wider. The draft clevis may be set higher or lower according to circumstances, and the absence of a landside enables the use of the device on curves and the ditch will be perfect. The form of the moldboards is such that a sharp cutting edge is presented to the soil at all times regardless of the adjustment. The detachable point and cutters facilitate sharpening and permit the use of light material in the moldboard as the strain and wear are all taken by the detachable edge. The operator stands on the runner 9 just back of the cross brace 5. and by adjusting the standard 15 sets the implement to form a wider or narrower ditch with both sides of the ditch exactly alike. When the moldboards are fully lowered, the cutting edges are held clear of the ground by the runner 9, as will be understood upon reference to Fig. 3 and the dotted lines in Fig. 1, so that the implement may be readily transported over fields and roads.

The pawl and ratchet mechanism shown in Figs. 8 and 9, is particularly adapted for use on large machines while the latch or dog shown in Fig. 3 is found more satisfactory in connection with smaller or lighter machines. It will be understood, however, that either adjusting mechanism may be used without departing from the spirit of the invention.

Having thus described the invention, I claim:

1. In a structure of the class described, a substantially V-shaped longitudinally elongated excavating device comprising a pair of converging moldboards having cutting means associated therewith, a cross brace disposed between the rear end portions of said moldboards and having a central guide opening, a runner arranged longitudinally and centrally between the moldboards and pivotally connected at its forward end to the frontal converging end portions thereof, a rack bar pivotally attached to and rising from the intermediate portion of said runner and extending up through the opening in said cross brace, and a latch carried by said cross brace and co-operable with the teeth on the adjacent face of said bar.

2. In a structure of the class described, a substantially V-shaped longitudinally elongated excavating device comprising a pair of converging moldboards having cutting means associated therewith, a cross brace disposed between the rear end portions of said moldboards and having a central guide opening, a runner arranged longitudinally and centrally between the moldboards and pivotally connected at its forward end to the front converging end portions thereof, a rack bar pivotally attached to and rising from the intermediate portion of said runner and extending up through the opening in said cross brace, a pair of brackets carried by said cross-brace, a shaft mounted for rotation in said brackets, a hand-wheel carried by said shaft, and a pinion also carried by said shaft and engageable with said rack bar.

3. In a structure of the class described, a substantially V-shaped excavating device comprising a pair of converging moldboards having cutting means associated with their lower edge portions, a centrally apertured cross brace secured to and extending between the rear end portions of the moldboards, a turnbuckle structure supported between the frontal portions of the moldboards, a centralized longitudinally extending transversely bowed runner located between said plates and having its forward end provided with hooks rockably connected with the turnbuckle, together with detachable retaining clips co-operable with the hooks to hold the runner removably in place, an upright pivotally connected at its lower end to the intermediate portion of the runner and extending up through the aperture in the cross brace and provided with rack teeth, releasable retaining means on the cross bar for engaging the rack teeth, and a pair of depending resilient stabilizing shoes carried by the cross brace to facilitate transportation of the apparatus when the excavator is in lowered position.

4. A ditcher comprising a pair of forwardly converging moldboards, cutting elements secured to the front ends of the moldboards and along the lower edges of the same, a turnbuckle secured in and between the moldboards near the front ends thereof, a runner disposed longitudinally between the moldboards, hooks at the front ends of the runner extending upwardly and rearwardly to engage over the end portions of the turnbuckle, and clips secured on the runner at the rear of and bearing against the turnbuckle.

FRED KNOBEL. [L. S.]